(12) United States Patent
Hayashi

(10) Patent No.: US 9,150,125 B2
(45) Date of Patent: Oct. 6, 2015

(54) VEHICLE SLIDE RAIL DEVICE

(71) Applicant: SHIROKI CORPORATION, Fujisawa-Shi, Kanagawa (JP)

(72) Inventor: Naoki Hayashi, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 14/384,710

(22) PCT Filed: Sep. 27, 2013

(86) PCT No.: PCT/JP2013/076190
§ 371 (c)(1),
(2) Date: Sep. 12, 2014

(87) PCT Pub. No.: WO2014/054512
PCT Pub. Date: Apr. 10, 2014

(65) Prior Publication Data
US 2015/0060626 A1    Mar. 5, 2015

(30) Foreign Application Priority Data

Oct. 5, 2012 (JP) .................................. 2012-223041

(51) Int. Cl.
*F16M 11/38* (2006.01)
*B60N 2/08* (2006.01)
*B60N 2/07* (2006.01)

(52) U.S. Cl.
CPC ............ *B60N 2/0818* (2013.01); *B60N 2/0705* (2013.01); *B60N 2/0722* (2013.01); *B60N 2/0875* (2013.01); *B60N 2/0881* (2013.01)

(58) Field of Classification Search
CPC .... B60N 2/0818; B60N 2/075; B60N 2/0875; B60N 2/0881; B60N 2/0722
See application file for complete search history.

(56) References Cited

U.S. PATENT DOCUMENTS

| 5,524,504 A | 6/1996 | Brandoli et al. |
| 8,387,936 B2 * | 3/2013 | Tarusawa et al. ............ 248/429 |
| 8,936,227 B2 * | 1/2015 | Kawamura et al. ........... 248/548 |
| 9,038,981 B2 * | 5/2015 | Hoshihara et al. ............ 248/429 |
| 2013/0168524 A1 | 7/2013 | Aoi |

FOREIGN PATENT DOCUMENTS

| JP | 2012-56379 A | 3/2012 |
| JP | 2012-126182 A | 7/2012 |

OTHER PUBLICATIONS

International Search Report dated Oct. 22, 2013 issued in corresponding PCT/JP2013/076190 application (p. 1).
English Translation Abstract of JP 2012-056379 published Mar. 22, 2012.
English Translation Abstract of JP 2012-126182 published Jul. 5, 2012.

* cited by examiner

*Primary Examiner* — Amy Sterling
(74) *Attorney, Agent, or Firm* — Millen, White, Zelano, Branigan, P.C.

(57) ABSTRACT

A vehicle slide rail device is provided. The slide rail device includes a locking portion 51 which forms a region that is located between the first supported portion 50*a* and the second supported portion 53 of the lock spring 50, a pressed portion 50*b*, which is pressed by the lock release lever 40, formed on a portion of the lock spring between the second supported portion and the locking portion 51 that is positioned closest to the first supported portion, and a fracture-inducing portion provided on a portion of the lock spring between the pressed portion and the locking portion that is positioned closest to the first supported portion of the lock spring.

1 Claim, 7 Drawing Sheets

VEHICLE SLIDE RAIL DEVICE

TECHNICAL FIELD

The present invention relates to a vehicle slide rail device which supports a seat in a slidable manner.

BACKGROUND ART

Patent Literature 1 is a prior art vehicle slide rail device, which is provided with a pair of left and right lower rails which are fixed to a vehicle interior floor, extend in the forward/rearward direction and include a large number of lock grooves arranged in a forward/rearward direction; a pair of left and right upper rails which support a seating portion of a seat and are slidably supported by the left and right lower rails; lock springs, supported by the upper rails and each having a locking portion which is disengageably-engageable with the lock grooves from below; and lock-release levers which are respectively supported by the upper rails so that the lock-release levers are rotatable between a locked position, at which the lock-release levers do not act on the lock springs, and an unlocked position, at which the lock-release levers act on the lock springs to eject each locking portion from the corresponding lock groove.

In this slide rail device, when an occupant applies no operating force to the lock-release levers, the slide position of the seat and upper rails with respect to the lower rails is maintained by the locking portion of each lock spring engaging with one of the lock grooves. On the other hand, upon an occupant rotating the lock-release levers to the unlocked position against the biasing force of the lock springs, the locking portion of each lock spring disengages from the associated lock groove to thereby allow the seat and the upper rails to slide with respect to the lower rails.

CITATION LIST

Patent Literature

PATENT LITERATURE 1: U.S. Pat. No. 5,524,504

SUMMARY OF THE INVENTION

Technical Problem

In the vehicle slide rail device disclosed in Patent Literature 1, when an occupant rotates the lock-release lever(s) to the unlocked position against the biasing force of the lock springs, stress occurs at various locations on each lock spring. Accordingly, there is a possibility of a fracture occurring at any of the lock-spring positions (at a location where a large stress occurs compared to the other locations).

However, in some cases, depending on the location of the fracture in the lock spring, the locking portion carries out the locking/unlocking operation as per usual when the lock-release lever is rotationally operated, even though part of the lock spring has fractured. However, there is a possibility that the occupant (driver) does not notice that the lock spring has fractured in such a case, and hence, a fracture occurring in such a manner is undesirable.

The present invention provides a vehicle slide rail device which can reliably make the operator notice an occurrence of a fracture while continually maintaining a locked state after a lock spring has fractured, thereby ensuring safety, in a structure in which the lock spring which disengageably engages with lock grooves formed in a lower rail is moved in a locking direction/unlocking direction by utilizing a lock-release lever.

Solution to Problem

A vehicle slide rail device according to the present invention is characterized by including a lower rail which extends in a forward/rearward direction and is provided with a large number of locked portions, which are arranged in the forward/rearward direction, the lower rail being immovable relative to a floor of the vehicle; an upper rail which is supported by the lower rail to be slidable in the forward/rearward direction and provided with two supporting portions, which are separated from each other in the forward/rearward direction; a lock spring, formed by processing a single metal wire material, which is provided with first and second supported portions, respectively supported by the two supporting portions and are separate from each other in the forward/rearward direction, and at least one locking portion which is selectively disengageably-engageable with the locked portions, wherein a biasing force of the lock spring biases the locking portion in a direction to engage with the locked portions; and a lock release lever, supported by the upper rail, which is rotatable between a locked position, at which the locking portion is allowed to engage with the locked portions, and an unlocked position, at which the lock release lever presses the lock spring in a direction such that the locking portion escapes from the locked portions against the biasing force. The locking portion forms a region that is located between the first supported portion and the second supported portion of the lock spring. A pressed portion, which is pressed by the lock release lever, is formed on a portion of the lock spring between the second supported portion and the locking portion that is positioned closest to the first supported portion. A fracture-inducing portion is provided on a portion of the lock spring between the pressed portion and the locking portion that is positioned closest to the first supported portion of the lock spring.

Advantageous Effects of the Invention

According to the invention of claim 1, when an occupant rotates the lock-release lever to the unlocked position against the biasing force of the lock springs, stress occurs at various locations on each lock spring. Accordingly, there is a possibility of a fracture occurring at a fracture-inducing portion of the lock spring.

However, since the fracture-inducing portion is provided between an abutment portion and the locking portion that is provided closest to a first supported portion of the lock spring (formed by a metal wire material), if a fracture occurs at the fracture-inducing portion, the rotational operating force of the lock-release lever is not transmitted to the locking portion (that is provided closest to the first supported portion) even if the lock-release lever is thereafter rotationally operated. Accordingly, since the locking portion will continue to be engaged with one of the lock grooves even if the lock-release lever is rotationally operated, the operator can reliably be made to notice the occurrence of a fracture in the lock spring.

DESCRIPTION OF EMBODIMENTS

Figure 1:
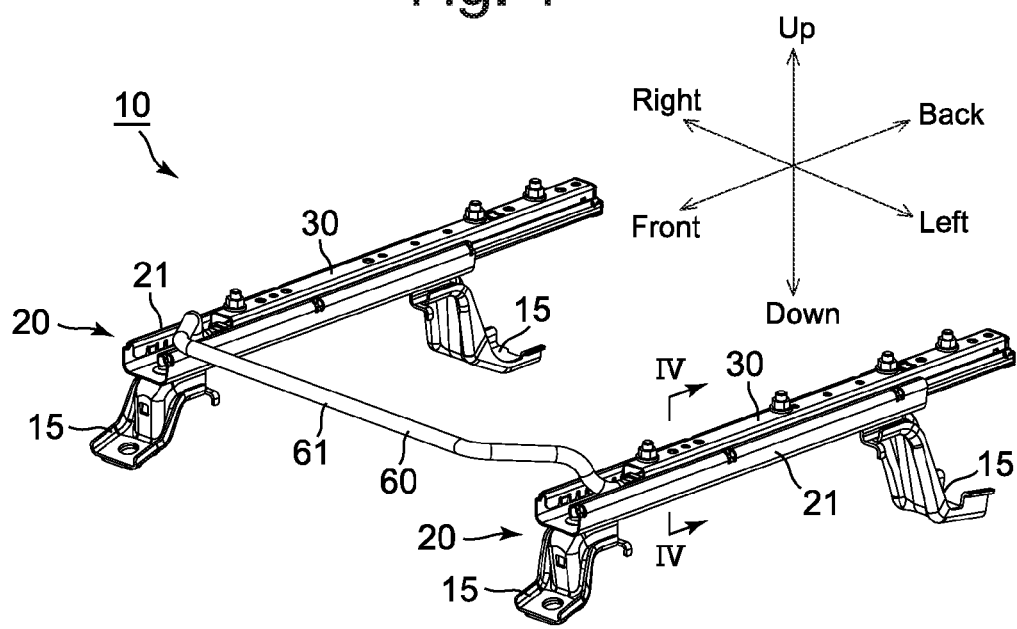
FIG. 1 is a front perspective view showing an embodiment of a right-sided slide seat device (of a driver seat), according to the present invention, viewed obliquely from above, in which the upper rails have been slided to the rear ends.
Figure 2:
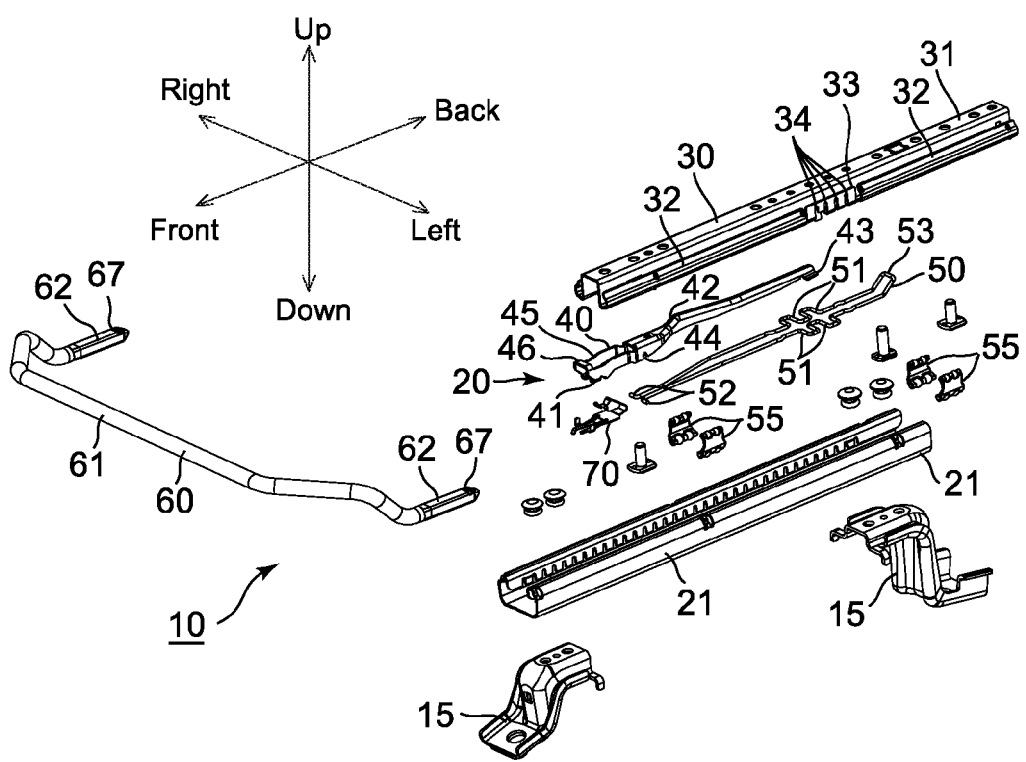
FIG. 2 is a front exploded perspective view showing the right-sided slide rail device with the right rail unit omitted, viewed obliquely from above.
Figure 3:
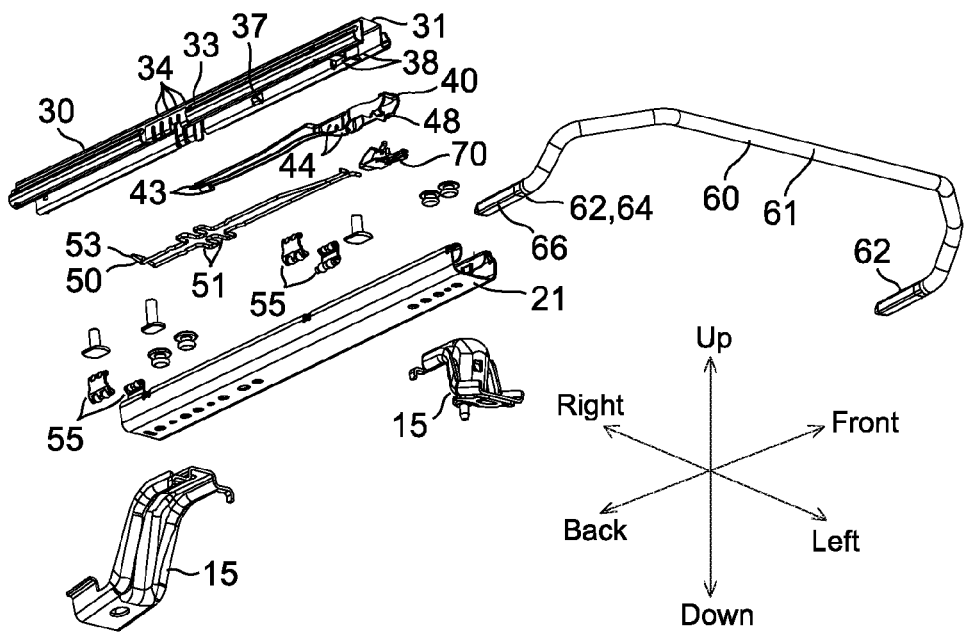
FIG. 3 is a front exploded perspective view showing the right-side slide rail device with the left rail unit omitted, viewed obliquely from below.

An embodiment of the present invention will be hereinafter discussed with reference to the attached drawings. Note that directions described in the following description are defined based on the directions of arrows shown in the drawings.

A slide rail device 10 is installed onto a vehicle interior floor of an automobile (vehicle), not shown in the drawings. A seat (not shown) is fixed to upper surfaces of the slide rail device 10 (upper rails 30).

The detailed structure of the slide rail device 10 will be discussed hereinafter.

The slide rail device 10 supports a right seat (or driver seat) and is provided, as large components thereof, with a pair of left and right rail units 20, and a loop handle 60 which connects the front ends of the left and right rail units 20. The left and right rail units 20 are bilaterally-symmetrical while the loop handle 60 has a bilaterally-symmetrical shape, and hence, the slide rail device 10 is bilaterally symmetrical as a whole.

The left and right rail units 20 have the following structure.

Figure 5:
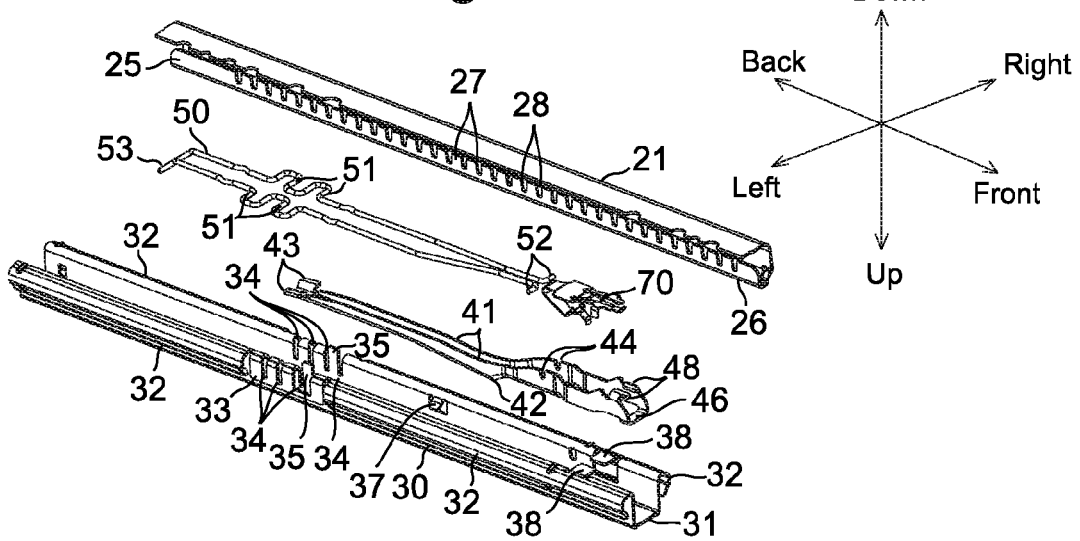
FIG. 5 is an exploded perspective view of a rail unit showing the lower rail in a longitudinal sectional view.

Each rail unit 20 is provided with a lower rail 21 which is mounted onto the vehicle interior floor via a pair of front and rear mounting brackets 15. Each lower rail 21 is a metal channel member which extends in the forward/rearward direction and the top thereof is open, and is provided with a substantially-horizontal bottom wall 22, a left and right pair of outer wall portions 23 which extend upward from the left and right sides of the bottom wall 22, respectively, left and right pair of roof underside portions 24 which extend inward from the top edges of the left and right pair of outer wall portions 23, respectively, and a pair of left and right inner wall portions 25 which extend downwardly from the inner edges of the left and right roof underside portions 24. As shown in FIG. 5, etc., the upper edge portions of the left and right inner wall portions 25 (the portions connected to the roof underside portions 24) constitute base-end supporting portions 26 that extend in the forward/rearward direction. Lower edge portions of the left and right inner wall portions 25 are provided with a large number of lock teeth 27, the upper ends thereof connecting with the base-end supporting portions 26, arranged at equal intervals in the forward/rearward direction. Lock grooves 28 (locked portion), the bottom ends of which are open, are formed between mutually adjacent lock teeth 27.

Figure 6:
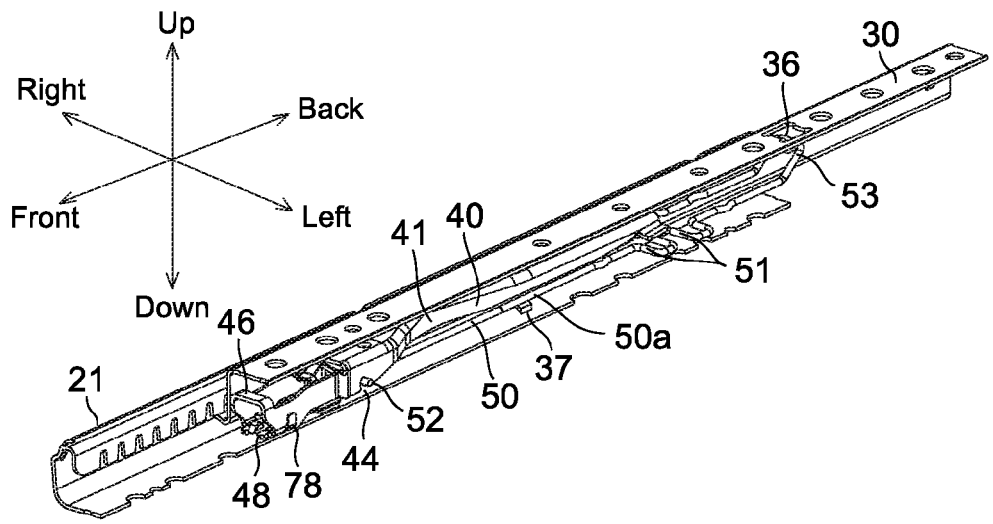
FIG. 6 is a front perspective view of the rail unit showing a cross sectional view of the lower rail, viewed obliquely from above.
Figure 7:
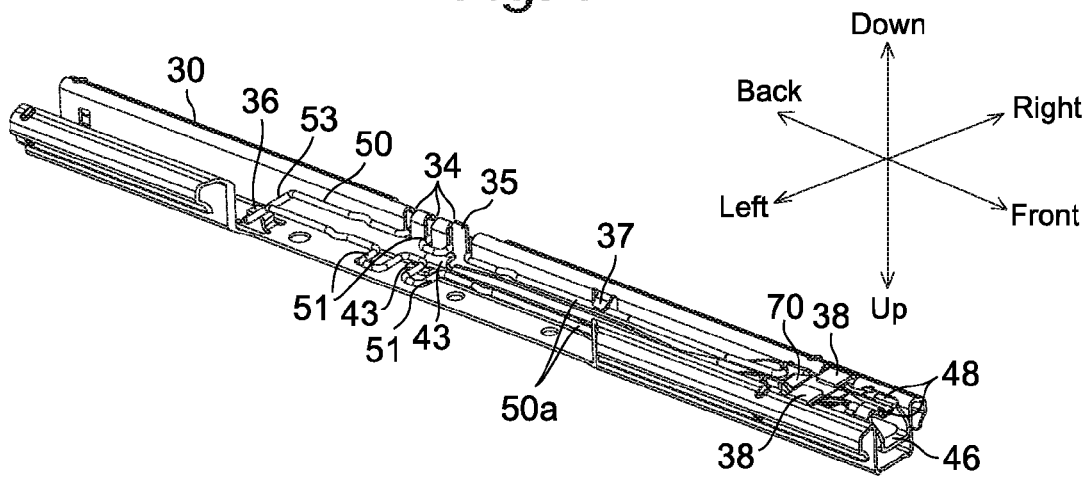
FIG. 7 is a front perspective view of the upper rail, with a section thereof cut-away, a lock-release lever, and a lock spring, viewed obliquely from below.

Each rail unit 20 is provided with an upper rail 30 that is slidable in the forward/rearward direction with respect to the associated lower rail 21. The upper rail 30 is a metal channel member which extends in the forward/rearward direction and the bottom thereof is open, and is provided with a base 31 having a substantially inverted U-shaped cross section, upright walls 32 which extend upward from lower end portions of the left and right side walls of the base 31, excluding central portions thereof in the longitudinal direction, and locking walls 33 which extend upward from the above-mentioned central portions of the side walls. As shown in FIGS. 2, 3, 5 and 9, etc., four forward/rearward movement restriction grooves 34 are formed over the lower edges of the left and right locking walls 33 and the lower edges of the side walls of the base 31 to extend upward. Furthermore, downward projecting restriction portions 35 are integrally provided on lower edges of the side wall portions of the base portion 31 in the vicinity of the front end thereof and extend further downward than the lower ends of the forward/rearward movement restriction grooves 34. In addition, as shown in FIGS. 6 and 7, etc., the base 31 is provided, in the rear portion of the roof portion thereof, with a lock-engaging lug 36 (supporting portion) which is formed by cutting and raising a portion of the base 31 to extend downward and rearward. Furthermore, lock-engaging lugs 37 (supporting portions), which are formed by cutting and raising portions of the left and right side wall portions of the base portion 31, are positioned slightly in front of central portions of the left and right side wall portions, and extend inwardly. Furthermore, substantially horizontal lower support portions 38, which project inwardly from the lower edges of the left and right side walls, are integrally provided on the base 31 near the front end thereof.

Each rail unit 20 is further provided with a lock release lever 40, a lock spring 50, and a biasing spring 70 that are installed in the associated upper rail 30.

The lock release lever 40 is a press-molded metal channel member, formed from a metal plate, which extends in the forward/rearward direction and the bottom thereof is open, and is provided with a pair of left and right side walls 41. As shown in FIGS. 2, 5, 10 and 11, etc., a rotational contact protrusion 42 which extends in the leftward/rightward direction protrudes from an upper surface of the lock release lever 40. In addition, a pair of left and right substantially horizontal spring pressing-pieces 43 are respectively provided on the rear end portion of the lock release lever 40, and upward-facing spring-hook grooves 44 are formed in the lower edges of the front portions (the portions positioned forward from the rotational contact protrusion 42) of the left and right side walls 41, respectively. As shown in FIG. 12, etc., a roof hole 45 is formed in the upper side of the lock release lever 40 in the vicinity of the front end thereof, and an upper supporting portion 46 is provided at the upper portion of the front end of the lock release lever 40 to connect the front ends of the left and right side walls 41. Furthermore, a spring-hook recess 47 is formed at the lower edge at the vicinity of the front ends of the left and right side walls 41, and inwardly-facing substantially horizontal underside supporting pieces 48 are provided on the lower edges of the front ends of the left and right side walls 41.

A biasing spring 70 is a bilaterally-symmetrical member that is press-formed out of a metal plate. The biasing spring 70 is provided with a flat-plate base-surface supporting portion 71; an upper-surface pressing piece 72 which extends rearwardly from the rear end of the base-surface supporting portion 71, and thereafter extends obliquely forward and upward, and thereafter extends obliquely forward and downward; a base-surface pressing piece 76 which extends obliquely forward and upward from a front edge of the base-surface supporting portion 71 and the front end of the base-surface pressing piece 76 is bent obliquely forward and downward; and a pair of left and right side arms 77 which extend forward from the front edge of the base-surface supporting portion 71. The rear end portion of the upper-surface pressing piece 72 forms an insertion end 73 having a substantially sideways V-shape, in a side elevational view, and a handle pressing portion 74, which is provided with a pair of left and right downward-facing lock-engagement pieces 75, is formed on the front end portion of the upper-surface pressing piece 72. Furthermore, upward-facing lock-engagement pieces 78 are provided on the left and right side arms 77, in the vicinity of the front ends thereof.

The biasing spring 70 is inserted into an internal space (the space located directly below the roof hole 45) of the front-end portion of the lock release lever 40 from the front-end opening (between the upper supporting portion 46 and the underside supporting pieces 48) of the lock release lever 40. When the biasing spring 70 is inserted, since the insertion end 73 of the biasing spring 70 is inserted into the downward-facing U cross-sectional shaped portion of the lock release lever 40 (in a space located behind the space that is directly below the roof hole 45) (see FIG. 15), and furthermore, since the left and right side arms 77 are placed on the upper surfaces of the left and right underside supporting pieces 48 and the upward-facing lock-engagement pieces 78 engage with the left and right spring-hook recesses 47 of the lock release lever 40 from below, the biasing spring 70 becomes integral with the lock release lever 40.

Figure 17:
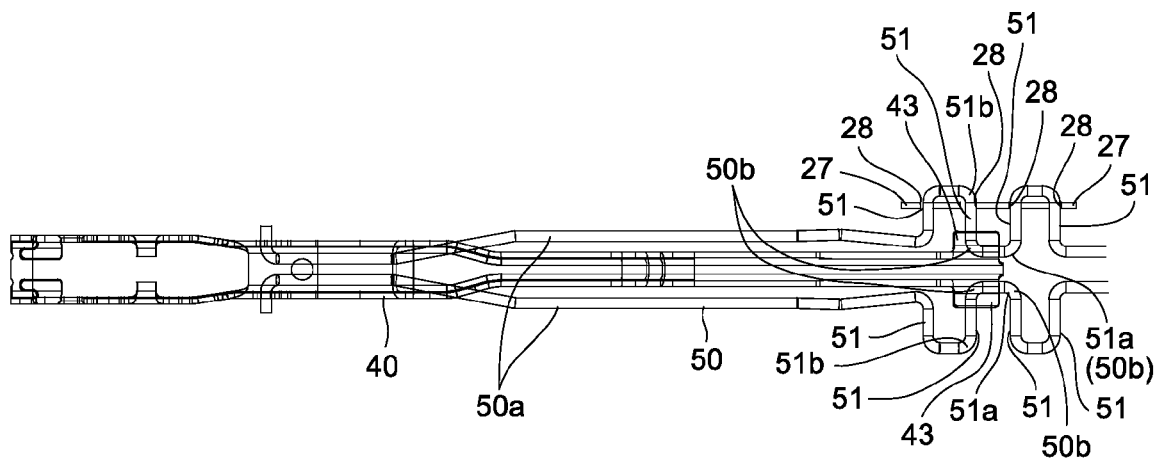
FIG. 17 is a plan view of part of the lower rail, the lock-release lever and lock spring.
Figure 18:
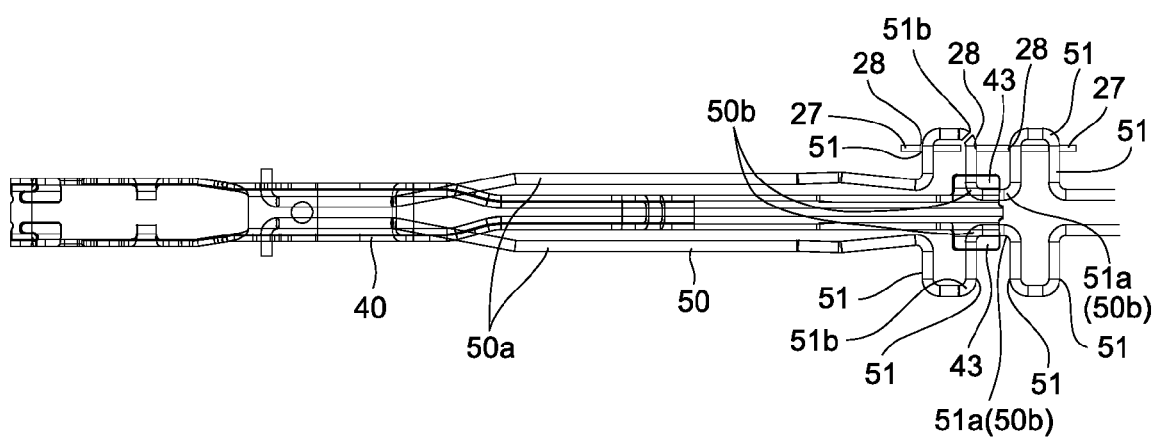
FIG. 18 is a plan view similar to that of FIG. 17, in which the lock spring has fractured.

The lock spring 50 is a bilaterally-symmetrical member formed by bending a single metal wire rod. The fracturing stress of the lock spring 70 is the same at any position thereof. Four locking portions 51 which linearly extend substantially horizontally outwards are formed on portions of each of left and right side portions of the lock spring 50 at positions slightly behind the central portion of the lock spring 50 with respect to the longitudinal direction, and are arranged in the forward/rearward direction. As shown in FIGS. 17 and 18, the fore-ends of the first and second (from the front) locking portions 51 side, and the fore-ends of the third and fourth (from the front) locking portions 51 are mutually connected via connecting sections extending the forward/rearward direction; furthermore, the base ends of the second and third (from the front) locking portions 51 are connected via connecting sections 51a extending in the forward/rearward direction. The part of the lock spring 50 (except the rear end portion thereof) that is positioned behind the rearmost locking portions 51 is substantially horizontal when in a free state, and the part of the lock spring 50 that is positioned in front of the frontmost locking portions 51 is substantially horizontal when in a free state. The lock spring 50 is provided at the front end thereof with a pair of left and right front-end locking lugs 52 which project outwardly in a substantially horizontal direction, and the rear-end portion of the lock spring 50 constitutes a rear-end lock-engaging portion 53 (second supported portion or first supported portion), which is inclined upwardly in a side elevational view.

Figure 10:
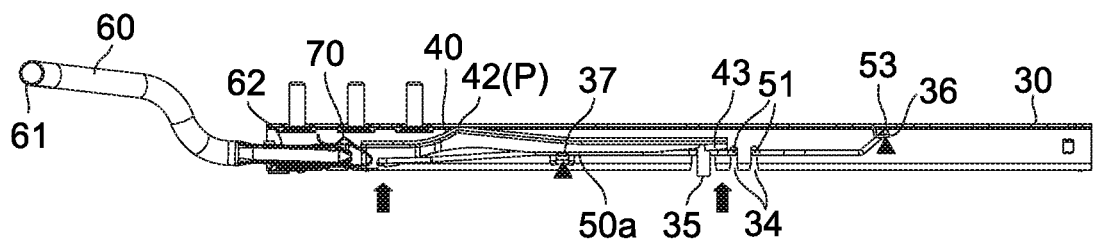
FIG. 10 is a side elevational view of the upper rail, the lock-release lever, a biasing spring and a loop handle, when in a locked state, in which only the upper rail is shown as a longitudinal section view.
Figure 11:
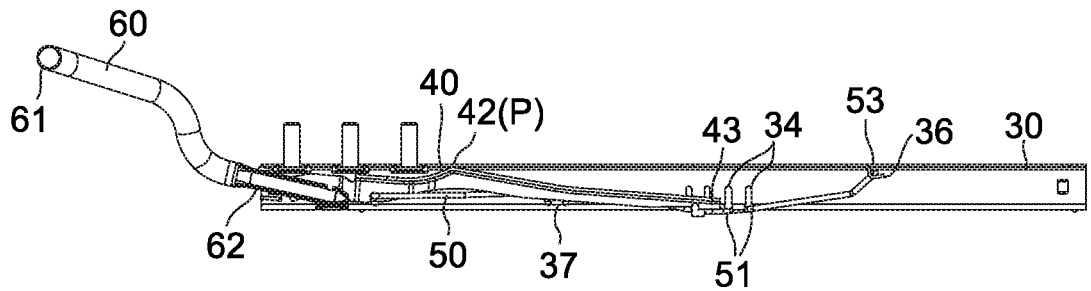
FIG. 11 is side elevational view similar to that of FIG. 10 when in an unlocked state, with the biasing spring omitted.
Figure 12:
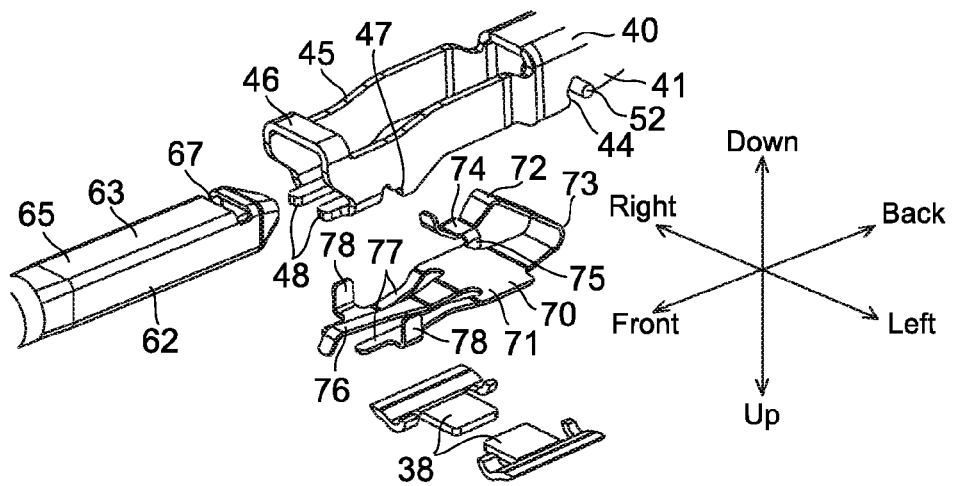
FIG. 12 is an enlarged exploded perspective view showing the front-end portion of the lock-release lever, the biasing spring, a lower supporting portion, and a rear-end portion of the loop handle.
Figure 13:
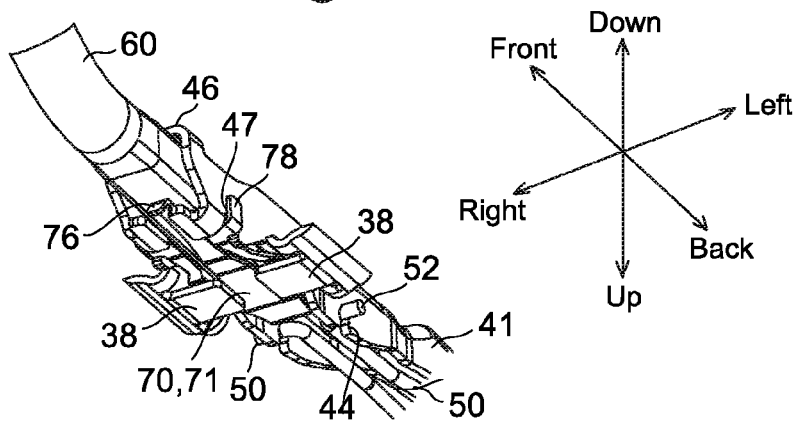
FIG. 13 is an enlarged perspective view of the front-end portion of the lock-release lever, the biasing spring, and the rear-end portion of the loop handle when mutually assembled with each other, viewed from below.
Figure 14:
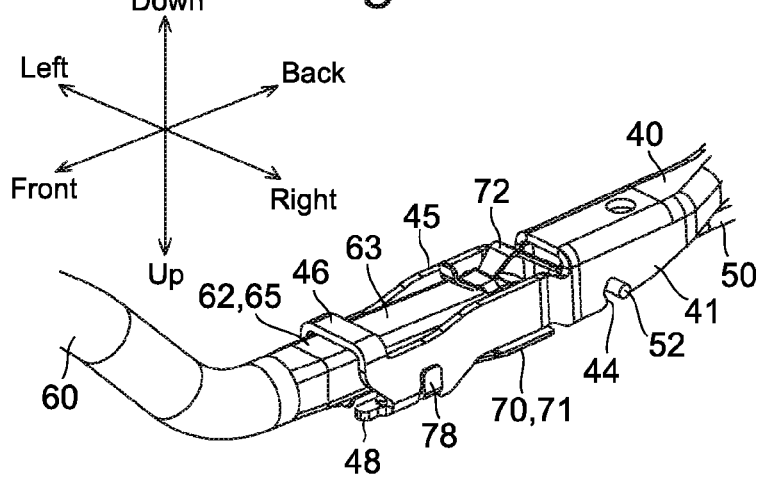
FIG. 14 is an enlarged perspective view of the front-end portion of the lock-release lever, the biasing spring, and the rear-end portion of the loop handle when mutually assembled with each other, viewed from above.
Figure 15:
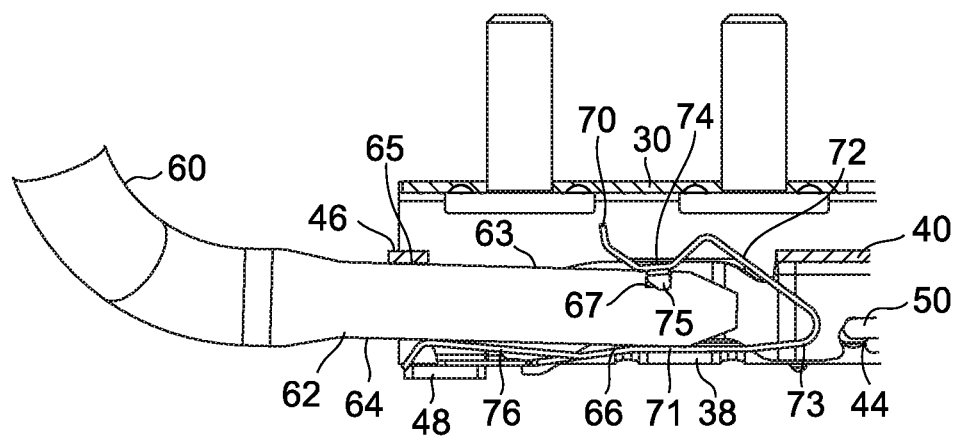
FIG. 15 is an enlarged longitudinal sectional view of the front end portions of the upper rail and the lock-release lever, the biasing spring and the rear end portion of the loop handle in a locked state.
Figure 16:
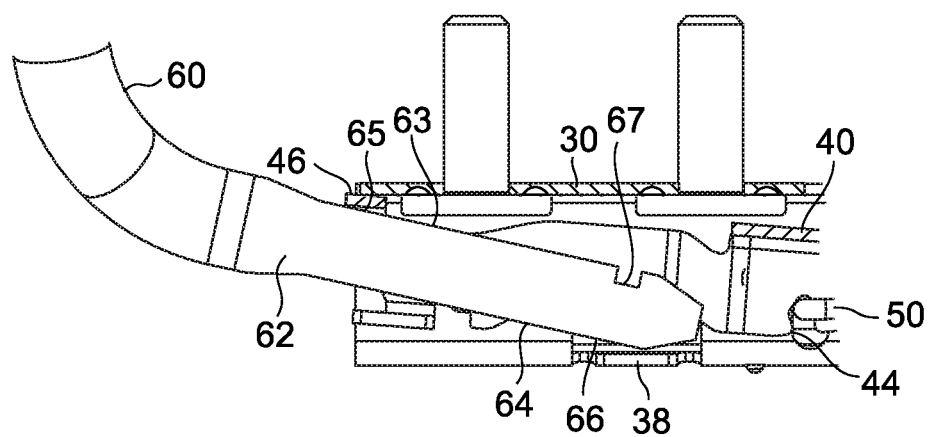
FIG. 16 is an enlarged longitudinal sectional view, similar to that of FIG. 15, in an unlocked state with the biasing spring omitted.

The lock release lever 40 (and the biasing spring 70) is almost entirely accommodated in the associated upper rail 30 from the front end opening thereof (between the front end portion of the base 31 and the lower support portions 38) (as shown in FIGS. 15 and 16, only the front end portion of the upper supporting portion 46 projects forwardly from the upper rail 30), and the rotational contact protrusion 42 is in contact with a roof undersurface of the base 31 (see a contact portion "P" in FIGS. 10 and 11. Spaces are formed between the upper surface of the lock release lever 40, except the rotational contact protrusion 42, and a roof undersurface of the base 31). As shown in FIGS. 6 through 8, FIG. 10 and FIG. 11, in the lock spring 50, the rear-end lock-engaging portion 53 is lock-engaged with the lock-engaging lug 36 (see the triangular mark in FIG. 10), an intermediate lock-engaging portion 50a (first supported portion or second supported portion) positioned slightly forward from the frontmost locking portions 51 of the left and right sides are respectively lock-engaged with the left and right lock-engaging lugs 37 (see the triangular mark in FIG. 10), the locking portions 51 are engaged with the corresponding forward/rearward movement restriction grooves 34 from below, and the left and right front-end locking lugs 52 are lock-engaged with the spring-hook grooves 44 from below. Furthermore, as shown in FIGS. 17 and 18, the spring pressing-pieces 43 are in contact, from above, with the upper sides of respective pressed portions 50b defined by the base ends of the second (from the front) locking portions 51 of the lock spring 50 and parts of the connecting sections 51a (at locations at a forward position from the intermediate portions) which are continuous with these second locking portions 51. Hence, upon attaching the lock spring 50 to the upper rail 30 and the lock release lever 40, the lock spring 50 is moveable relative to the upper rail 30 in the forward/rearward direction within a very small range, such that the lock-engagement of the rear-end lock-engaging portion 53 of the lock spring 50 with the lock-engaging lug 36 is not released and the lock-engagement of the front-end locking lugs 52 is maintained with the spring-hook grooves 44. In addition, since the lock spring 50 produces an upward biasing force (elastic force) by being elastically deformed (see arrows t shown in FIG. 10), this biasing force causes the rotational contact protrusion 42 of the lock release lever 40 to be pressed against the roof underside portion of the base 31, which enables the lock release lever 40 to rotate about the rotational contact protrusion 42 (about an imaginary rotation axis extending in the leftward/rightward direction) about the contact portion P between the roof underside portion and the rotational contact protrusion 42, and the lock release lever 40 is held in the locked position shown in FIGS. 10 and 15 when no upward external force is exerted on the front end portion of the lock release lever 40. Since the lock spring 50 elastically deforms, as described above, when the lock release lever 40 is positioned at the locked position, stress occurs over the entirety of the lock spring 50; however, the stress occurring at various locations on the lock spring 50 is smaller than the above-mentioned fracturing stress. Furthermore, the stress occurring at various locations on the lock spring 50 is substantially the same.

On the other hand, exerting an upward external force on the front end portion of the lock release lever 40 against the biasing force of the lock spring 50 causes the lock lever 40 to rotate to the unlocked position shown in FIGS. 11 and 16. Thereupon, since the spring pressing-pieces 43 of the lock release lever 40 downwardly depress the pressed portions 50b, each locking portion 51 escapes downward from the associated lock groove 28 (see the locking portions 51 indicated with the imaginary lines shown in FIG. 9). Since the amount of elastic deformation of the lock spring 50 at this time is larger than when the lock release lever 40 is positioned at the locked position, the stress that occurs at various locations on the lock spring 50 becomes larger than when the lock release lever 40 is at the locked position. Furthermore, the lock spring 50 is designed so that during the rotation of the lock release lever 40 from the locked position to the unlocked position, or when the lock release lever 40 has rotated to the unlocked position, the stress (a value of stress divided by the fracturing stress) of each corner portion 51b of the second (from the front) locking portions 51 is maximum out of the entirety of the lock spring 50. However, the stress at various locations on the lock spring 50 (including the stress of the corner portions 51b) is at a value less than the above-mentioned fracturing stress.

Figure 4:
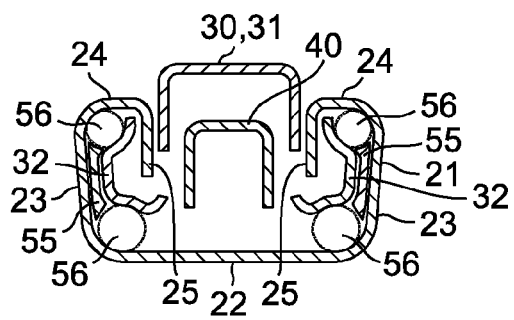
FIG. 4 is a cross sectional view taken along the line IV-IV shown in FIG. 1.

An assembly made by inserting an upper rail 30, a lock release lever 40 and a lock spring 50, which are integrated in the above described manner, into a lower rail 21 from the front end opening or rear end opening of the lower rail 21 constitutes a rail unit 20. When a rail unit 20 is assembled, the upright walls 32 and the locking walls 33 of the upper rail 30 enter the spaces formed between the outer wall portions 23 and the inner wall portions 25 as shown in FIG. 4 (the locking walls 33 are omitted in FIG. 4), and a plurality of bearing balls 56 which are rotatably supported by retainers 55 installed in the aforementioned spaces are in rotatable contact with both outer surfaces of the upright walls 32 and inner surfaces of the outer wall portions 23, which allow the upper rail 30 (and the lock release lever 40 and the lock spring 50) to slide in the forward/rearward direction with respect to the lower rail 21. Furthermore, since a front-end stopper and a rear-end stopper, which are omitted from the drawings, are provided between the upper rail 30 and the lower rail 21, each upper rail 30 is slidable relative to the lower rail 21 between a front-end position (not shown) and a rear-end position (the position in FIG. 1).

Figure 8:
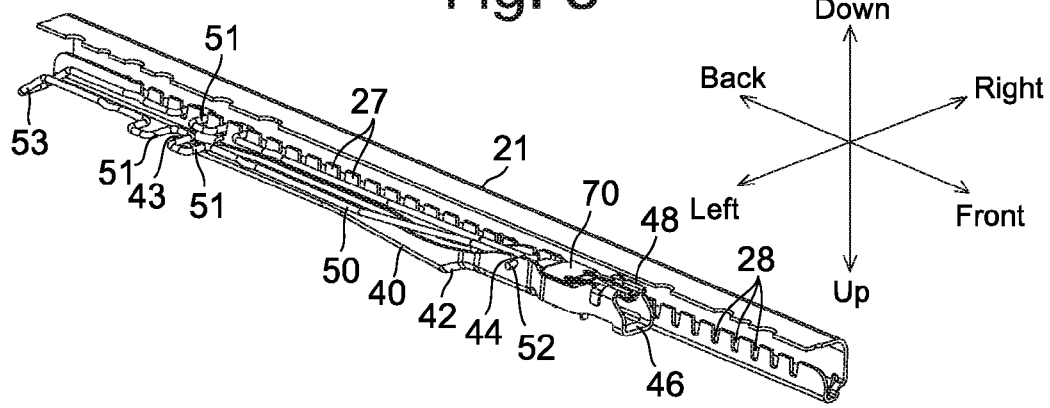
FIG. 8 is a front perspective view of the lower rail, shown as a longitudinal section view, the lock-release lever, and the lock spring, viewed obliquely from below.
Figure 9:
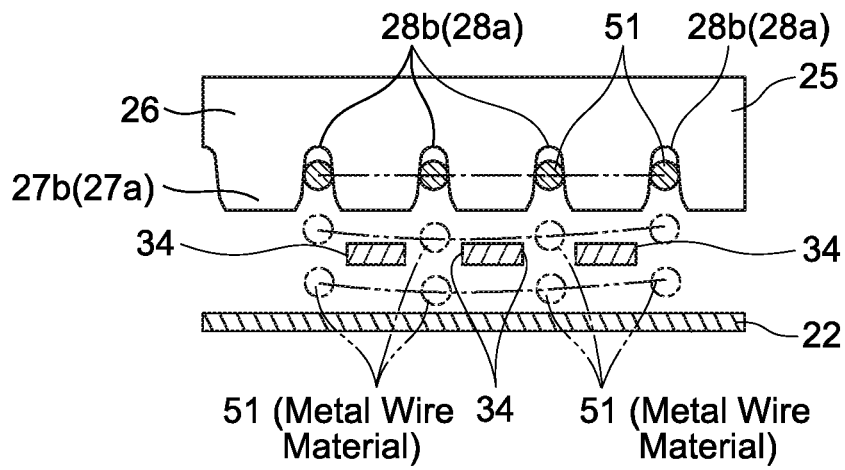
FIG. 9 is a schematic side elevational view showing states of the lock spring when the lock-release lever is positioned at the locked position and the unlocked position.

In addition, when the lock release lever 40 is in the locked position, the upper rail 30 is prevented from sliding with respect to the lower rail 21 because each locking portion 51 is engaged with the associated forward/rearward movement restriction groove 34 and lock groove 28 from below as shown in FIG. 8 and by solid lines in FIG. 9. On the other hand, rotating the lock release lever 40 down to the unlocked position causes each locking portion 51 which was engaged with some of the lock grooves 28 to be disengaged downward therefrom as shown by the phantom lines in FIG. 9, which allows the upper rail 30 to slide with respect to the lower rail 21.

The pair of left and right rail units 20 thus assembled are made to be parallel to each other and the positions thereof in the forward/rearward direction are made to coincide with each other (the sliding positions of the upper rails 30 with respect to the lower rails 21 are also made to coincide with each other); thereafter, a seating portion of a seat (not shown) is mounted onto the upper surfaces of the upper rails 30.

After the left and right rail units 20 and the seat 11 are integrated in this manner, the loop handle 60 is connected to the left and right lock release levers 40 using the biasing springs 70.

The loop handle 60 is made by bending a metal pipe member, and is provided with an operation portion 61 which extends in the leftward/rightward direction, a pair of oblique portions extending obliquely rearwardly downward from both left and right ends of the operation portion 61, and a pair of rear-end connecting portions 62 which respectively extend rearwardly from both left and right ends of the oblique portions. An upper contacting surface 63 and the lower contacting surface 64 of each rear-end connecting portion 62 are mutually parallel (horizontal) flat surfaces. The front portion of each upper contacting surface 63 constitutes an upper supported portion 65, and the rear portion of each lower contacting surface 64 constitutes a lower supported portion 66. Furthermore, a lock-engaging groove 67 which extends in the leftward/rightward direction is formed in the vicinity of the rear end of each upper contacting surface 63.

The loop handle 60 is connected to the lock release levers 40 by inserting the left and right rear-end connecting portions 62 into the internal spaces of the front ends of the lock release levers 40, respectively. Upon inserting the rear-end connecting portions 62, each rear-end connecting portion 62 enters into a space between the base-surface supporting portion 71 and the upper-surface pressing piece 72 (handle pressing portion 74), the base-surface supporting portion 71 contacts the lower contacting surface 64, the left and right downward-facing lock-engagement pieces 75 engage with the lock-engaging groove 67, and the handle pressing portion 74 comes in contact with the vicinity of the rear end of the upper contacting surfaces 63 (the periphery of the lock-engaging groove 67). Since upward/downward space between the base-surface supporting portion 71 and the handle pressing portion 74 is narrower than the upward/downward dimensions of the rear-end connecting portions 62 before the rear-end connecting portions 62 are inserted into each internal space of the front end portion of each lock release lever 40, when the rear-end connecting portion 62 is inserted in the space between the base-surface supporting portion 71 and the upper-surface pressing piece 72 (handle pressing portion 74), the upper-surface pressing piece 72 elastically deforms upwards, and the pressing force from the base-surface supporting portion 71 and the handle pressing portion 74 respectively applies against the lower contacting surface 64 and the upper contacting surfaces 63. Furthermore, the vicinity of the front end of the base-surface pressing piece 76, which has elastically deformed downwardly, comes in contact with the front portion of the lower contacting surface 64. Subsequently, the left and right rear-end connecting portions 62 and the front ends of the lock release levers 40 become integral with each other via the biasing springs 70, respectively, and each rear-end connecting portion 62 is, in effect, restricted from moving in the forward/rearward direction relative to the lock release lever 40.

Upon assembling the slide rail device 10 by integrating the loop handle 60 with the left and right rail units 20, as described above, since the rear-end connecting portions 62 constantly receive an upward biasing force from the base-surface pressing pieces 76 and constantly receive a downward biasing force from the upper-surface pressing pieces 72 (handle pressing portions 74), each upper supported portion 65 is constantly in contact (so as to be rotatable about an axis extending in the leftward/rightward direction) with the corresponding upper supporting portion 46, each lower supported portion 66 is constantly in contact with the associated base-surface supporting portion 71, and the base-surface supporting portion 71 is constantly in contact (so as to be rotatable about an axis extending in the leftward/rightward direction) with the associated lower support portion 38.

An assembled slide rail device 10 is attached to the vehicle interior floor by mounting the mounting brackets 15, to which the left and right lower rails 21 are mounted, onto the vehicle interior floor.

Upon the occupant grasping the operation portion 61, of the loop handle 60 of the slide rail device 10, by hand and rotating the entire loop handle 60 upwards, this rotational force is transmitted from the rear-end connecting portions 62 to the front end portions of the lock release levers 40, so that the lock release levers 40 rotate upwardly with the rear-end connecting portions 62. Accordingly, since the lock release levers 40 that were positioned at the locked position rotate to the unlocked position, the upper rails 30, which were restricted from sliding relative to the lower rail 21, become slidable relative to the lower rails 21. Whereas, upon the entire loop handle 60 being rotated downwards to return to the initial position thereof, the lock release levers 40 rotate downward together with the rear-end connecting portions 62 by the biasing force of the lock springs 50, respectively (by the locking portions 51 engaging with the lock grooves 28 from below). Subsequently, since each lock release lever 40, which was positioned at the unlocked position, rotates to the locked position, the sliding of each upper rail 30 is again restricted relative to each lower rail 21.

When the lock release lever 40 is positioned at either of the positions described above, stress occurs at various locations on the lock spring 50; and furthermore, while the lock release lever 40 rotates from the locked position to the unlocked position, and when the lock release lever 40 rotates to the unlocked position, stress occurring at the corner portion 51b of the second (from the front) locking portions 51 becomes greatest out of the stress throughout the entire lock spring 50. Therefore, as shown in FIG. 18, an unexpected fracture can occur at the corner portion 51b of either the left or right (or both the left and right) lock spring 50 (in the case where an unexpected fracture occurs, there is a high probability of it occurring at a corner portion 51b). However, each corner portion 51b is positioned between a pressed portion 50b and the front locking portion 51 (the locking portions 51 that are positioned closed to the intermediate lock-engaging portion 50a) on the lock spring 50 (formed by a metal wire material). Accordingly, if a fracture occurs at a corner portion 51b, even if a rotational operation of the lock release lever 40 were to be performed thereafter, the rotational operating force of the lock release lever 40 (the pressing force from the spring pressing-pieces 43 to the pressed portions 50b) is not transmitted to the first (from the front) locking portions 51. Accordingly, even if the lock release lever 40 is rotationally operated, the positional relationship of the first (from the front) locking portions 51 and the corresponding lock grooves 28 does not change, so that the locking/unlocking operation via the lock release lever 40 cannot be performed. In other words, if a corner portion 51b fractures in a state where the first (from the front) locking portions 51 are engaged with the corresponding lock grooves 28, the first (from the front) locking portions 51 continue to be engaged with the corresponding lock grooves 28, and if a corner portion 51b fractures in a state where the first (from the front) locking portions 51 are downwardly disengaged from the corresponding lock grooves 28, the first (from the front) locking portions 51 engage with the lock grooves and this engaged state is continually maintained by the biasing force of the lock spring 50; accordingly, the operator can reliably be made to notice that the lock spring 50 has fractured.

Although the present invention has been described based on the above illustrated embodiments, various modifications can be made to the above illustrated embodiment.

For example, the number of locking portions 51 on the left and right sides of the lock spring 50 can also be one or a plural number other than four. Furthermore, the locking portions 51 can be provided on only one of the left and right sides of the lock spring 50. However, if such modified embodiments were implemented, the lock spring 50 would still be formed by bending a single wire, and setting the positional relationship of the various locations on the lock spring 50 (the positional relationship on the extending direction (path) of the lock spring 50 (metal wire)) in the following manner. In other words, at least one locking portion 51 is formed at a location between the intermediate lock-engaging portion 50a and the rear-end lock-engaging portion 53, and furthermore, the pressed portions 50b are positioned between the locking portions 51 that are positioned closest to one of the engaging portions of the lock spring 50 (one of the intermediate lock-engaging portion 50a and the rear-end lock-engaging portion 53) and the other of the engaging portions of the lock spring 50 (the other of the intermediate lock-engaging portion 50a and the rear-end lock-engaging portion 53), and form a region (fracture-inducing portion), corresponding to the corner portion 51b, on the lock spring 50 between the pressed portions 50b and the locking portions 51 that are positioned closest to the one of the engaging portions (the one of the intermediate lock-engaging portion 50a and the rear-end lock-engaging portion 53).

INDUSTRIAL APPLICABILITY

The vehicle slide rail device according to the present invention, in a structure in which a lock spring which engages with lock grooves formed in a lower rail is moved in a locking direction/unlocking direction by utilizing a lock-release lever, enables a locking state to be continually maintained even after the lock spring has fractured, thereby ensuring safety, while reliably making the operator notice an occurrence of the fracture.

REFERENCE SIGNS LIST

10 Slide rail device
15 Mounting bracket
20 Rail unit
21 Lower rail
22 Bottom wall
23 Outer wall portion
24 Roof underside portion
25 Inner wall portion (vertical wall)
26 Base-end supporting portion
27 Lock teeth
28 Lock grooves (locked portion)
30 Upper rail 31 Base
32 Upright walls
33 Locking walls
34 Forward/rearward movement restriction grooves
36 37 Lock-engaging lug (supporting portion)
38 Lower support portion
40 Lock release lever
41 Side walls
42 Rotational contact protrusion
43 Spring pressing-piece
44 Spring-hook groove
45 Roof hole
46 Upper supporting portion
47 Spring-hook recess
48 Underside supporting pieces
50 Lock spring
50a Intermediate lock-engaging portion (first supported portion or second supported portion)
50b Pressed portions
51 Locking portions
51a Connecting sections
51b Corner portions
52 Front-end locking lugs
53 Rear-end lock-engaging portion (second supported portion or first supported portion)
55 Retainers
56 Bearing balls
60 Loop handle
61 Operation portion
62 Rear-end connecting portion
63 Upper contacting surface
64 Lower contacting surface
65 Upper supported portion
66 Lower supported portion
67 Lock-engaging groove
70 Biasing spring
71 Base-surface supporting portion
72 Upper-surface pressing piece
73 Insertion end
74 Handle pressing portion
75 Downward-facing lock-engagement pieces
76 Base-surface pressing piece
77 Side arm
78 Upward-facing lock-engagement pieces
P Contact portion

The invention claimed is:

1. A slide rail device of a vehicle, comprising:
a lower rail which extends in a forward/rearward direction and is provided with a large number of locked portions, which are arranged in the forward/rearward direction, said lower rail being immovable relative to a floor of the vehicle;
an upper rail which is supported by said lower rail to be slidable in said forward/rearward direction and provided with two supporting portions, which are separated from each other in the forward/rearward direction;
a lock spring, formed by processing a single metal wire material, which is provided with first and second supported portions, respectively supported by said two supporting portions and are separate from each other in the forward/rearward direction, and at least one locking portion which is selectively disengageably-engageable with said locked portions, wherein a biasing force of said lock spring biases said locking portion in a direction to engage with said locked portions; and
a lock release lever, supported by said upper rail, which is rotatable between a locked position, at which said locking portion is allowed to engage with said locked portions, and an unlocked position, at which said lock release lever presses said lock spring in a direction such that said locking portion escapes from said locked portions against said biasing force,
wherein said locking portion forms a region that is located between said first supported portion and said second supported portion of said lock spring,
wherein a pressed portion, which is pressed by said lock release lever, is formed on a portion of said lock spring between said second supported portion and the locking portion that is positioned closest to said first supported portion, and
wherein a fracture-inducing portion is provided on a portion of said lock spring between said pressed portion and said locking portion that is positioned closest to said first supported portion of said lock spring.

* * * * *